US011627552B1

(12) United States Patent
Kaikkonen et al.

(10) Patent No.: US 11,627,552 B1
(45) Date of Patent: Apr. 11, 2023

(54) OFFSET VALUE FOR PAGING EARLY INDICATION

(71) Applicant: Nokia Technologies Oy, Espoo (FI)

(72) Inventors: Jorma Johannes Kaikkonen, Oulu (FI); Mads Lauridsen, Gistrup (DK); Frank Frederiksen, Klarup (DK); Jussi-Pekka Koskinen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/961,407

(22) Filed: Oct. 6, 2022

(30) Foreign Application Priority Data

Oct. 15, 2021 (FI) ........................................ 20216071

(51) Int. Cl.
*H04W 68/00* (2009.01)
*H04W 68/02* (2009.01)
*H04W 72/12* (2009.01)

(52) U.S. Cl.
CPC ......... *H04W 68/005* (2013.01); *H04W 68/02* (2013.01); *H04W 72/1205* (2013.01)

(58) Field of Classification Search
CPC ........................... H04W 68/00; H04W 72/1205
See application file for complete search history.

(56) References Cited

U.S. PATENT DOCUMENTS

| 2022/0046582 A1* | 2/2022 | Shrivastava | ........ H04W 68/005 |
| 2022/0225237 A1* | 7/2022 | He | ...................... H04W 68/005 |
| 2022/0232514 A1* | 7/2022 | Tseng | ..................... H04W 60/00 |
| 2022/0271878 A1* | 8/2022 | Lin | ......................... H04W 68/02 |
| 2022/0312369 A1* | 9/2022 | He | ......................... H04W 68/02 |

FOREIGN PATENT DOCUMENTS

| CN | 113163476 A | 7/2021 |
| WO | 2021/175032 A1 | 9/2021 |
| WO | 2021/180206 A1 | 9/2021 |

OTHER PUBLICATIONS

"3rd Generation Partnership Project; Technical Specification Group Radio Access Network; NR; User Equipment (UE) procedures in Idle mode and RRC Inactive state (Release 16)", 3GPP TS 38.304, V16.6.0, Sep. 2021, pp. 1-39.
"3rd Generation Partnership Project; Technical Specification Group Radio Access Network; NR; Radio Resource Control (RRC) protocol specification (Release 16)", 3GPP TS 38.331, V16.6.0, Sep. 2021, pp. 1-961.
"Revised WID UE Power Saving Enhancements for NR", 3GPP TSG RAN meeting #88e, RP-200938, Agenda: 9.10.7, MediaTek Inc, Jun. 29-Jul. 3, 2020, 5 pages.
"Moderator's summary for discussion [93e-18-PowSav-WI]: Final Round", 3GPP TSG RAN Meeting #93-e, RP-212611, Agenda: 9.3.2.3, Moderator (CMCC), Sep. 13-17, 2021, 20 pages.

(Continued)

Primary Examiner — Kashif Siddiqui
(74) Attorney, Agent, or Firm — Nokia Technologies Oy

(57) ABSTRACT

Disclosed is a method comprising selecting, based on one or more criteria, at least one offset value from a set of at least two pre-defined offset values, wherein the selected at least one offset value indicates a time offset between a paging early indication and a paging occasion; and transmitting, to at least one terminal device, the paging early indication on at least one time occasion indicated by the selected at least one offset value.

20 Claims, 9 Drawing Sheets

(56) References Cited

OTHER PUBLICATIONS

"On paging enhancements for UE power saving", 3GPP TSG RAN WG1 #106bis-e, R1-2110311, Agenda: 8.7.1.1, Nokia, Oct. 11-19, 2021, 9 pages.
"Summary#1 of Paging Enhancements", 3GPP TSG RAN WG1 #106bis-e, R1-210XXXX, Agenda: 8.7.1.1, MediaTek, Oct. 11-19, 2021, 20 pages.
"Summary#1 of Paging Enhancements", 3GPP TSG RAN WG1 #106bis-e, R1-210XXXX, Agenda: 8.7.1.1, MediaTek, Oct. 11-19, 2021, 44 pages.
"3rd Generation Partnership Project; Technical Specification Group Radio Access Network; NR; NR and NG-RAN Overall Description; Stage 2 (Release 16)", 3GPP TS 38.300, V16.7.0, Sep. 2021, pp. 1-152.
Office action received for corresponding Finnish Patent Application No. 20216071, dated Mar. 9, 2022, 10 pages.
"Paging enhancements for UE power saving in Idle/inactive mode", 3GPP TSG RAN WG1 Meeting #106bis, R1-2108744, Agenda: 8.7.1.1, Huawei, Oct. 11-19, 2021, 12 pages.
Office action received for corresponding Finnish Patent Application No. 20216071, dated Sep. 8, 2022, 6 pages.

\* cited by examiner

OFFSET VALUE FOR PAGING EARLY INDICATION

RELATED APPLICATION

This application claims priority from FI application No. 20216071 filed on Oct. 15, 2021, which is hereby incorporated in its entirety.

FIELD

The following exemplary embodiments relate to wireless communication.

BACKGROUND

Paging is a mechanism used to initiate communication services for terminal devices that are in idle or inactive state. It is desirable to reduce the signaling overhead and power consumption associated with the paging mechanism.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: select, based on one or more criteria, at least one offset value from a set of at least two pre-defined offset values, said one or more criteria comprising at least a configured paging cycle of at least one terminal device, wherein the selected at least one offset value indicates a time offset between a paging early indication and a paging occasion; and transmit, to the at least one terminal device, the paging early indication on at least one time occasion indicated by the selected at least one offset value.

According to another aspect, there is provided an apparatus comprising means for: selecting, based on one or more criteria, at least one offset value from a set of at least two pre-defined offset values, said one or more criteria comprising at least a configured paging cycle of at least one terminal device, wherein the selected at least one offset value indicates a time offset between a paging early indication and a paging occasion; and transmitting, to the at least one terminal device, the paging early indication on at least one time occasion indicated by the selected at least one offset value.

According to another aspect, there is provided a method comprising: selecting, based on one or more criteria, at least one offset value from a set of at least two pre-defined offset values, said one or more criteria comprising at least a configured paging cycle of at least one terminal device, wherein the selected at least one offset value indicates a time offset between a paging early indication and a paging occasion; and transmitting, to the at least one terminal device, the paging early indication on at least one time occasion indicated by the selected at least one offset value.

According to another aspect, there is provided a computer program product comprising program instructions which, when run on a computing apparatus, cause the computing apparatus to perform at least the following: selecting, based on one or more criteria, at least one offset value from a set of at least two pre-defined offset values, said one or more criteria comprising at least a configured paging cycle of at least one terminal device, wherein the selected at least one offset value indicates a time offset between a paging early indication and a paging occasion; and transmitting, to the at least one terminal device, the paging early indication on at least one time occasion indicated by the selected at least one offset value.

According to another aspect, there is provided a computer program comprising instructions for causing an apparatus to perform at least the following: selecting, based on one or more criteria, at least one offset value from a set of at least two pre-defined offset values, said one or more criteria comprising at least a configured paging cycle of at least one terminal device, wherein the selected at least one offset value indicates a time offset between a paging early indication and a paging occasion; and transmitting, to the at least one terminal device, the paging early indication on at least one time occasion indicated by the selected at least one offset value.

According to another aspect, there is provided a computer readable medium comprising program instructions for causing an apparatus to perform at least the following: selecting, based on one or more criteria, at least one offset value from a set of at least two pre-defined offset values, said one or more criteria comprising at least a configured paging cycle of at least one terminal device, wherein the selected at least one offset value indicates a time offset between a paging early indication and a paging occasion; and transmitting, to the at least one terminal device, the paging early indication on at least one time occasion indicated by the selected at least one offset value.

According to another aspect, there is provided a non-transitory computer readable medium comprising program instructions for causing an apparatus to perform at least the following: selecting, based on one or more criteria, at least one offset value from a set of at least two pre-defined offset values, said one or more criteria comprising at least a configured paging cycle of at least one terminal device, wherein the selected at least one offset value indicates a time offset between a paging early indication and a paging occasion; and transmitting, to the at least one terminal device, the paging early indication on at least one time occasion indicated by the selected at least one offset value.

According to another aspect, there is provided an apparatus comprising at least one processor, and at least one memory including computer program code, wherein the at least one memory and the computer program code are configured, with the at least one processor, to cause the apparatus to: select, based on one or more criteria, at least one offset value from a set of at least two pre-defined offset values, said one or more criteria comprising at least a configured paging cycle of the apparatus, wherein the selected at least one offset value indicates a time offset between a paging early indication and a paging occasion; and monitor for the paging early indication on at least one time occasion indicated by the selected at least one offset value.

According to another aspect, there is provided an apparatus comprising means for: selecting, based on one or more criteria, at least one offset value from a set of at least two pre-defined offset values, said one or more criteria comprising at least a configured paging cycle of the apparatus, wherein the selected at least one offset value indicates a time offset between a paging early indication and a paging occasion; and monitoring for the paging early indication on at least one time occasion indicated by the selected at least one offset value.

According to another aspect, there is provided a method comprising: selecting, based on one or more criteria, at least one offset value from a set of at least two pre-defined offset values, said one or more criteria comprising at least a configured paging cycle of the apparatus, wherein the selected at least one offset value indicates a time offset between a paging early indication and a paging occasion; and monitoring for the paging early indication on at least one time occasion indicated by the selected at least one offset value.

According to another aspect, there is provided a computer program comprising instructions for causing an apparatus to perform at least the following: selecting, based on one or more criteria, at least one offset value from a set of at least two pre-defined offset values, said one or more criteria comprising at least a configured paging cycle of the apparatus, wherein the selected at least one offset value indicates a time offset between a paging early indication and a paging occasion; and monitoring for the paging early indication on at least one time occasion indicated by the selected at least one offset value.

According to another aspect, there is provided a computer program product comprising program instructions which, when run on a computing apparatus, cause the computing apparatus to perform at least the following: selecting, based on one or more criteria, at least one offset value from a set of at least two pre-defined offset values, said one or more criteria comprising at least a configured paging cycle of the apparatus, wherein the selected at least one offset value indicates a time offset between a paging early indication and a paging occasion; and monitoring for the paging early indication on at least one time occasion indicated by the selected at least one offset value.

According to another aspect, there is provided a computer readable medium comprising program instructions for causing an apparatus to perform at least the following: selecting, based on one or more criteria, at least one offset value from a set of at least two pre-defined offset values, said one or more criteria comprising at least a configured paging cycle of the apparatus, wherein the selected at least one offset value indicates a time offset between a paging early indication and a paging occasion; and monitoring for the paging early indication on at least one time occasion indicated by the selected at least one offset value.

According to another aspect, there is provided a non-transitory computer readable medium comprising program instructions for causing an apparatus to perform at least the following: selecting, based on one or more criteria, at least one offset value from a set of at least two pre-defined offset values, said one or more criteria comprising at least a configured paging cycle of the apparatus, wherein the selected at least one offset value indicates a time offset between a paging early indication and a paging occasion; and monitoring for the paging early indication on at least one time occasion indicated by the selected at least one offset value.

According to another aspect, there is provided a system comprising at least one terminal device and a network element of a wireless communication network. The network element is configured to: select, based on one or more criteria, at least one offset value from a set of at least two pre-defined offset values, said one or more criteria comprising at least a configured paging cycle of the apparatus, wherein the selected at least one offset value indicates a time offset between a paging early indication and a paging occasion; and transmit, to the at least one terminal device, the paging early indication on at least one time occasion indicated by the selected at least one offset value. The at least one terminal device is configured to: select, based on the one or more criteria, the at least one offset value from the set of at least two pre-defined offset values; monitor for the paging early indication on the at least one time occasion indicated by the selected at least one offset value; and receive the paging early indication on the at least one time occasion.

According to another aspect, there is provided a system comprising at least one terminal device and a network element of a wireless communication network. The network element comprises means for: selecting, based on one or more criteria, at least one offset value from a set of at least two pre-defined offset values, said one or more criteria comprising at least a configured paging cycle of the apparatus, wherein the selected at least one offset value indicates a time offset between a paging early indication and a paging occasion; and transmitting, to the at least one terminal device, the paging early indication on at least one time occasion indicated by the selected at least one offset value. The at least one terminal device comprises means for: selecting, based on the one or more criteria, the at least one offset value from the set of at least two pre-defined offset values; monitoring for the paging early indication on the at least one time occasion indicated by the selected at least one offset value; and receiving the paging early indication on the at least one time occasion.

BRIEF DESCRIPTION OF THE DRAWINGS

In the following, various exemplary embodiments will be described in greater detail with reference to the accompanying drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
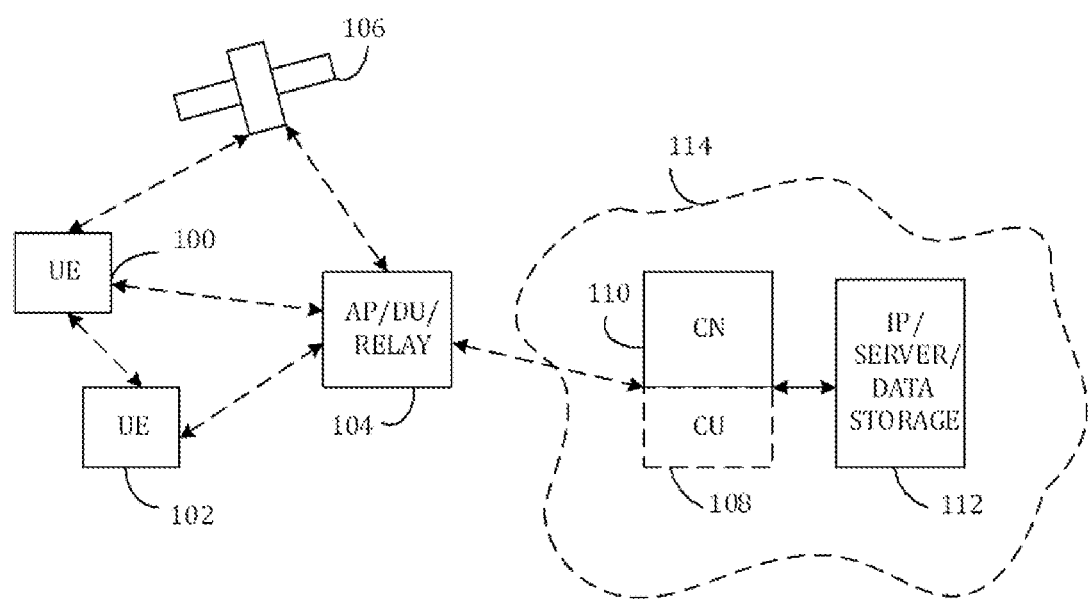
FIG. 1 illustrates an exemplary embodiment of a cellular communication network.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB may be called uplink or reverse link and the physical link from the (e/g)NodeB to the user device may be called downlink or forward link. It should be appreciated that (e/g)NodeBs or their functionalities may be implemented by using any node, host, server or access point etc. entity suitable for such a usage.

A communication system may comprise more than one (e/g)NodeB, in which case the (e/g)NodeBs may also be configured to communicate with one another over links, wired or wireless, designed for the purpose. These links may be used for signaling purposes. The (e/g)NodeB may be a computing device configured to control the radio resources of communication system it is coupled to. The (e/g)NodeB may also be referred to as a base station, an access point or any other type of interfacing device including a relay station capable of operating in a wireless environment. The (e/g)NodeB may include or be coupled to transceivers. From the transceivers of the (e/g)NodeB, a connection may be provided to an antenna unit that establishes bi-directional radio links to user devices. The antenna unit may comprise a plurality of antennas or antenna elements. The (e/g)NodeB may further be connected to core network 110 (CN or next generation core NGC). Depending on the system, the counterpart on the CN side may be a serving gateway (S-GW, routing and forwarding user data packets), packet data network gateway (P-GW), for providing connectivity of user devices (UEs) to external packet data networks, mobility management entity (MME), or location management function (LMF), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 3 relay (self-backhauling relay) towards the base station. The self-backhauling relay node may also be called an integrated access and backhaul (IAB) node. The IAB node may comprise two logical parts: a mobile termination (MT) part, which takes care of the backhaul link(s) (i.e., link(s) between IAB node and a donor node, also known as a parent node) and a distributed unit (DU) part, which takes care of the access link(s), i.e., child link(s) between the IAB node and UE(s) and/or between the IAB node and other IAB nodes (multi-hop scenario).

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave). One of the concepts considered to be used in 5G networks may be network slicing in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head (RRH) or a radio unit (RU), or a base station comprising radio parts. It may also be possible that node operations will be distributed among a plurality of servers, nodes or hosts. Carrying out the RAN real-time functions at the RAN side (in a distributed unit, DU 104) and non-real time functions in a centralized manner (in a central unit, CU 108) may be enabled for example by application of cloudRAN architecture.

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize satellite communication to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g)NodeBs or may be a Home(e/g)nodeB.

Furthermore, the (e/g)nodeB or base station may also be split into: a radio unit (RU) comprising a radio transceiver (TRX), i.e., a transmitter (Tx) and a receiver (Rx); one or more distributed units (DUs) that may be used for the so-called Layer 1 (L1) processing and real-time Layer 2 (L2) processing; and a central unit (CU) or a centralized unit that may be used for non-real-time L2 and Layer 3 (L3) processing. The CU may be connected to the one or more DUs for example by using an F1 interface. Such a split may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU may be defined as a logical node hosting higher layer protocols, such as radio resource control (RRC), service data adaptation protocol (SDAP) and/or packet data convergence protocol (PDCP), of the (e/g)nodeB or base station. The DU may be defined as a logical node hosting radio link control (RLC), medium access control (MAC) and/or physical (PHY) layers of the (e/g)nodeB or base station. The operation of the DU may be at least partly controlled by the CU. The CU may comprise a control plane (CU-CP), which may be defined as a logical node hosting the RRC and the control plane part of the PDCP protocol of the CU for the (e/g)nodeB or base station. The CU may further comprise a user plane (CU-UP), which may be defined as a logical node hosting the user plane part of the PDCP protocol and the SDAP protocol of the CU for the (e/g)nodeB or base station.

Cloud computing platforms may also be used to run the CU and/or DU. The CU may run in a cloud computing platform, which may be referred to as a virtualized CU (vCU). In addition to the vCU, there may also be a virtualized DU (vDU) running in a cloud computing platform. Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of labour between the above-mentioned base station units, or different core network operations and base station operations, may differ.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. In multilayer networks, one access node may provide one kind of a cell or cells, and thus a plurality of (e/g)NodeBs may be needed to provide such a network structure.

For fulfilling the need for improving the deployment and performance of communication systems, the concept of "plug-and-play" (e/g)NodeBs may be introduced. A network which may be able to use "plug-and-play" (e/g)NodeBs, may include, in addition to Home (e/g)NodeBs (H(e/g) nodeBs), a home node B gateway, or HNB-GW (not shown in FIG. 1). A HNB Gateway (HNB-GW), which may be installed within an operator's network, may aggregate traffic from a large number of HNBs back to a core network.

An RRC idle or inactive state may be used to reduce UE power consumption, and thus conserve the battery power of the UE. If the UE is in RRC connected state and it has no data to send or receive, then the gNB may wait for a specific timer (UE inactivity timer), and once that timer expires, the gNB may switch the UE to idle or inactive state. This may be done by sending a RRC release message to the UE.

Paging is a mechanism used to initiate communication services for UEs that are in RRC idle state or RRC inactive state. For example, the network may transmit a paging message to a UE in idle/inactive state in order to switch the UE to connected state, when the network needs to transmit downlink data to the UE. Paging may also be used by the network for other purposes, such as providing an earthquake and tsunami warning system (ETWS) notification to the UE, for triggering the UE to acquire a system information update, and/or for indicating the availability of a tracking reference signal (TRS) to the UE.

Thus, the UE may occasionally wake up to monitor whether the network is sending any paging message to it, but the UE has to spend some energy (battery power) to run this monitoring process on those time occasions. However, the UE can conserve its battery power by sleeping during the time when the network is not transmitting paging messages (instead of continuously monitoring for the paging messages).

This kind of reception mechanism may be referred to as discontinuous reception (DRX). During the idle/inactive state, the UE stays in sleep mode according to a DRX cycle, which may also be referred to as a paging cycle. The paging cycle indicates the time interval after which the UE wakes up and monitors for the paging message. The network may indicate the default paging cycle to the UE in system information block type 1 (SIB1), for example. As a non-limiting example, the default paging cycle may be 320 ms, 640 ms, 1280 ms, or 2560 ms. The UE may determine its paging cycle based on the shortest of the UE-specific DRX value(s) (if configured by RRC and/or upper layers), and/or the default paging cycle (default DRX value) broadcast in system information. In RRC idle state, if a UE-specific DRX value is not configured by the upper layers, the default DRX value may be applied.

As a non-limiting example, if the paging cycle is set to 1280 ms or 128 radio frames, then the UE may wake up in frame #3, then again in frame #131 (after 128 frames), and then again at frame #259, and so on. The radio frame in which the UE wakes up is called a paging frame (PF). Within a radio frame, there may be 10 subframes. However, the UE may not remain awake in all 10 subframes of the paging frame. Instead, the UE may wake up in a specific subframe, for example subframe 0, 4, 5 or 9, within the paging frame. These specific subframe(s) within a paging frame, when the UE wakes up, are called paging occasions (PO).

The system information may comprise a parameter NB, which depicts the number of paging subframes within the paging cycle. The UE may determine the paging frame based on the paging cycle, the parameter NB, and the UE identity. The UE identity may be based on the international mobile subscriber identity (IMSI) value of the UE. Once the UE has determined the paging frame, it may determine the subframe of the paging frame to wake up on.

Thus, the UE periodically wakes up according to the paging cycle and monitors a physical downlink control channel (PDCCH) for the paging downlink control information (DCI) in order to check for the presence of a paging message on a physical downlink shared channel (PDSCH). The paging DCI comprises the time-frequency allocation of the paging message on the PDSCH. If there is no allocation, the UE determines that it is not paged. If the PDCCH indicates that a paging message is transmitted in the subframe (i.e., if there is an allocation), then the UE proceeds with receiving the paging message on the PDSCH, and demodulates the paging channel (PCH) to see if the paging message is directed to it (the paging message might not be addressed to this specific UE, since there may be multiple UEs using the same paging cycle). If the UE finds its own identity in the paging message, it considers itself paged and may take appropriate action (e.g., sets up an RRC connection).

The network may transmit a paging early indication (PEI) to the UE before the paging occasion of the UE. The PEI may be used to indicate to the UE whether or not there is a paging message coming for the UE on the paging occasion. Thus, if the PEI indicates that there is no paging message coming, then the UE may skip procedures related to time-frequency synchronization, which may otherwise be needed to decode the PDSCH carrying the paging message. The PEI may be carried in PDCCH.

The PEI may divide the UEs into subgroups to further reduce the paging probability. For example, for UE subgroups indication in the physical layer, up to 8 subgroups per paging occasion may currently be supported (it should be appreciated that this number may change in the future). In other words, the PEI may indicate whether the UE should monitor a paging occasion, if the UE's group or subgroup is paged. The UE may not be required to monitor a certain paging occasion, if the UE does not detect a PEI on the PEI occasion(s) for the paging occasion. A PEI occasion (PEI-O) may also be referred to as a PEI monitoring occasion (MO).

The PEI may also carry non-paging-related information, such as an ETWS notification, system information update indication, and/or a TRS availability indication. After determining the PEI occasion, the UE may also check for these information bits in addition to whether it will be paged in the corresponding paging occasion.

The identification of PEI occasion(s) before a paging occasion may be achieved by using a configurable PEI detection time window and time offsets. For a target paging occasion, a PEI occasion may be defined as a set of PDCCH monitoring occasions associated with the transmitted synchronization signal blocks (SSBs). The reference PEI frame (PEI-F) start may be subject to a PEI offset before the paging frame of the paging occasion. In other words, the PEI may be placed before the paging occasion.

The PEI occasion may be determined based on an offset (time gap) to the paging frame of the paging occasion. The paging occasions are located in reference to the paging frame, and therefore the PEI occasion may be referenced to the same paging frame. For example, there may be up to four paging occasions per paging frame. It may also be possible to provide a separate offset for each paging frame, thus enabling to point different paging frames to the same PEI occasion, and thereby sharing the PEI (e.g., there may be a first offset value for a first paging frame and a second offset value for a second paging frame).

A minimum and/or maximum time offset may also be defined in order to enable the UE to determine whether to expect any SSBs to be present between the PEI and the paging occasion. The minimum time offset between the PEI and the paging occasion may be configurable. As a non-limiting example, the minimum time offset may correspond to one, two or three SSB bursts (i.e., the UE may expect to receive at least one, two or three SSBs between the PEI occasion and the paging occasion). Alternatively, the PEI may occur after the SSB burst (e.g., one SSB followed by PEI followed by two SSBs followed by the paging occasion), and/or there may be zero SSB bursts between the PEI and the paging occasion (e.g., one SSB followed by PEI followed by the paging occasion). As another non-limiting example, the minimum time offset may be specified as 50 ms. However, it should be noted that other minimum time offsets may also be used. The maximum time offset between SSB and PEI may also be configured to ensure that the PEI is close to the SSB.

Reduced capability (RedCap) devices may support extended DRX (eDRX) for RRC idle and RRC inactive state. In other words, RedCap devices may apply a longer paging cycle than non-RedCap devices (e.g., normal NR UEs or legacy UEs). For example, in eDRX, the maximum value of the DRX cycle (paging cycle) may be extended to at least 10.24 seconds (compared to a maximum value of 2.56 seconds used with legacy DRX). In RRC inactive, the eDRX configuration may be decided by the RAN and provided via RRC signaling. For RRC inactive, the DRX cycle may currently be extended to up to 10485.76 seconds (2.91 hours). The hyper system frame number (H-SFN) may be broadcast by the cell and incremented by one when the SFN wraps around. A paging hyperframe (PH) refers to the H-SFN, in which the UE starts monitoring paging DRX during a paging time window (PTW) used in connected management idle (CM-IDLE) state. The PH may be determined based on a formula that may be known by the access and mobility management function (AMF), UE, and the RAN. During the PTW, the UE may monitor paging for the duration of the PTW.

RedCap devices may have lower complexity (e.g., reduced bandwidth and number of antennas), a longer battery life, and a smaller form factor than non-RedCap devices, such as enhanced mobile broadband (eMBB) and ultra-reliable low latency communication (URLLC) devices. For example, a RedCap device may comprise 1 receiver branch and 1 transmitter branch (1RX/1TX), or 2 receiver branches and 1 transmitter branch (2RX/1TX), in both frequency range 1 (FR1) and frequency range 2 (FR2). RedCap devices may support all FR1 and FR2 bands for frequency-division duplexing (FDD) and time-division duplexing (TDD). Some examples of RedCap devices are industrial wireless sensors, video surveillance cameras, and wearables (e.g., smart watches, rings, eHealth-related devices, personal protection equipment, medical monitoring devices, etc.). RedCap devices may also be referred to as NR-Lite devices or NR-Light devices.

There is a challenge in how to facilitate the diverging needs of different UEs in terms of the time offset between the PEI and the paging occasion, without causing excessive signaling. For example, a RedCap device and a normal NR UE may have different requirements in terms of synchronization time and number of required SSBs. Furthermore, depending on the length of the paging cycle, the UE may require a different number of SSBs prior to the paging occasion due to the synchronization becoming less accurate for longer paging cycles. It should be noted that the PEI is for RRC idle/inactive UEs, which means that the network has limited knowledge about the current radio conditions of the UE.

In some exemplary embodiments, the network may signal the PEI with different time offsets between the PEI and the paging occasion, wherein the different time offsets may depend on, for example, the device type and/or the configured paging cycle of a given UE. The device type may also be referred to as UE category. RedCap device and non-RedCap device are some examples of devices types.

For example, the network may transmit the PEI in a first time-domain location (PEI occasion), in a second time-domain location (PEI occasion), or in both the first and the second time-domain locations. The first time-domain location may be a PEI occasion that is far from the paging occasion, for example with 2-3 SSB bursts in between the PEI and the paging occasion. The distance, or time offset, between the PEI and the paging occasion may be deterministic, such that the UE may monitor for the PEI at a specific time instant (PEI occasion). The second time-domain location may be a PEI occasion close to the paging occasion, for example with 0-1 SSB bursts in between the PEI and the paging occasion. The first time-domain location and the second time-domain location may correspond to different values of the time offset between the PEI and the paging occasion.

If the UE does not detect the PEI, the UE may not be required to monitor the paging occasion. Therefore, the network may dynamically select whether to transmit the PEI in none of the time-domain locations, in one of the time-domain locations, or in both (all) of the time domain locations. It should be noted that there may also be more than two configured time-domain locations.

In one example, the first time-domain location and the second time-domain location may be defined as a scaling of a number of SSBs, for example X*SSBs, with [X1; X2] referring to the value of X for the two locations. Similarly, the X-scaling may apply to any other periodicity defined by the network.

Alternatively, the time-domain locations (i.e., the PEI occasions) and/or the time offset may be defined as a (non-scaled) number of SSBs, or as a time-domain value (e.g., in seconds, slots, or subframes).

In one exemplary embodiment, the network may configure one or more UEs with a set of pre-defined device-type-specific PEI occasions, and/or a set of pre-defined device-type-specific offset values for determining the PEI occasion(s) to use for monitoring for the PEI. For example, the set of pre-defined device-type-specific offset values may comprise different offset values for RedCap devices and non-RedCap devices, respectively. The UE may then select an offset value based on the type of the UE in order to determine the PEI occasion. A larger offset value may be selected for a RedCap device than for a non-RedCap device.

As an example, if a RedCap device is within the tracking area, the network knows that the RedCap device needs more SSBs (i.e., a longer time) to synchronize (compared to non-RedCap devices) due to the limited processing capability of the RedCap device. Therefore, the network may signal PEI in the first time-domain location, if the RedCap device is to be paged. Likewise, if the paging is for a non-RedCap device (e.g., a normal NR UE), then the second time-domain location may be used to signal the PEI.

If the PEI is sent a long time in advance, it means that the UE has many opportunities to receive SSBs and synchronize. This may be beneficial for RedCap devices, but non-RedCap devices may not need such a long time. Thus, if a long time offset is used for non-RedCap devices, then they may wake up too early and have to go back to sleep for a long time before the paging occasion, which may not be necessary. A longer time offset between the PEI and the paging occasion also leads to a longer paging delay, and thus it may be beneficial to limit the length of the offset.

In another exemplary embodiment, the network may configure one or more UEs with a set of pre-defined UE-specific PEI occasions, and/or a set of pre-defined UE-specific offset values for determining the PEI occasion(s) to use for monitoring for the PEI.

In another exemplary embodiment, the network may configure one or more UEs with a set of pre-defined RRC-state-specific PEI occasions, and/or a set of pre-defined RRC-state-specific offset values for determining the PEI occasion(s) to use for monitoring for the PEI. For example, the set of pre-defined RRC-state-specific offset values may comprise different offset values for RRC idle and RRC inactive state, respectively. The UE may then select an offset value based on the current RRC state of the UE in order to determine the PEI occasion.

In another exemplary embodiment, the network may configure one or more UEs with a set of pre-defined paging-cycle-specific PEI occasions, and/or a set of pre-defined paging-cycle-specific offset values for determining the PEI occasion(s). Two or more paging-cycle-specific PEI monitoring occasions and/or offset values may be configured. As a non-limiting example, a first PEI occasion and/or offset value may be configured for paging cycles less than 2 seconds, a second PEI occasion and/or offset value may be configured for paging cycles less than 10 seconds, a third PEI occasion and/or offset value may be configured for paging cycles larger than 10 seconds, etc. The UE may then select the offset value based on the current paging cycle of the UE in order to determine the PEI occasion.

As an example, if the configured paging cycle of a UE is below a threshold value, then the network may use the second time-domain location to signal the PEI to the UE. The network may indicate the threshold value to the UE by broadcasting or UE-specific signaling, such that UEs with different paging cycles know whether they should monitor for the PEI at the first time-domain location or at the second time-domain location. For example, RedCap devices may benefit from using a longer paging cycle in order to save energy.

Alternatively, the offset value may be selected by comparing the configured paging cycle of the UE with one or more threshold values. For example, the offset value may be selected based on the paging cycle being within a certain range between two or more threshold values.

Figure 2:
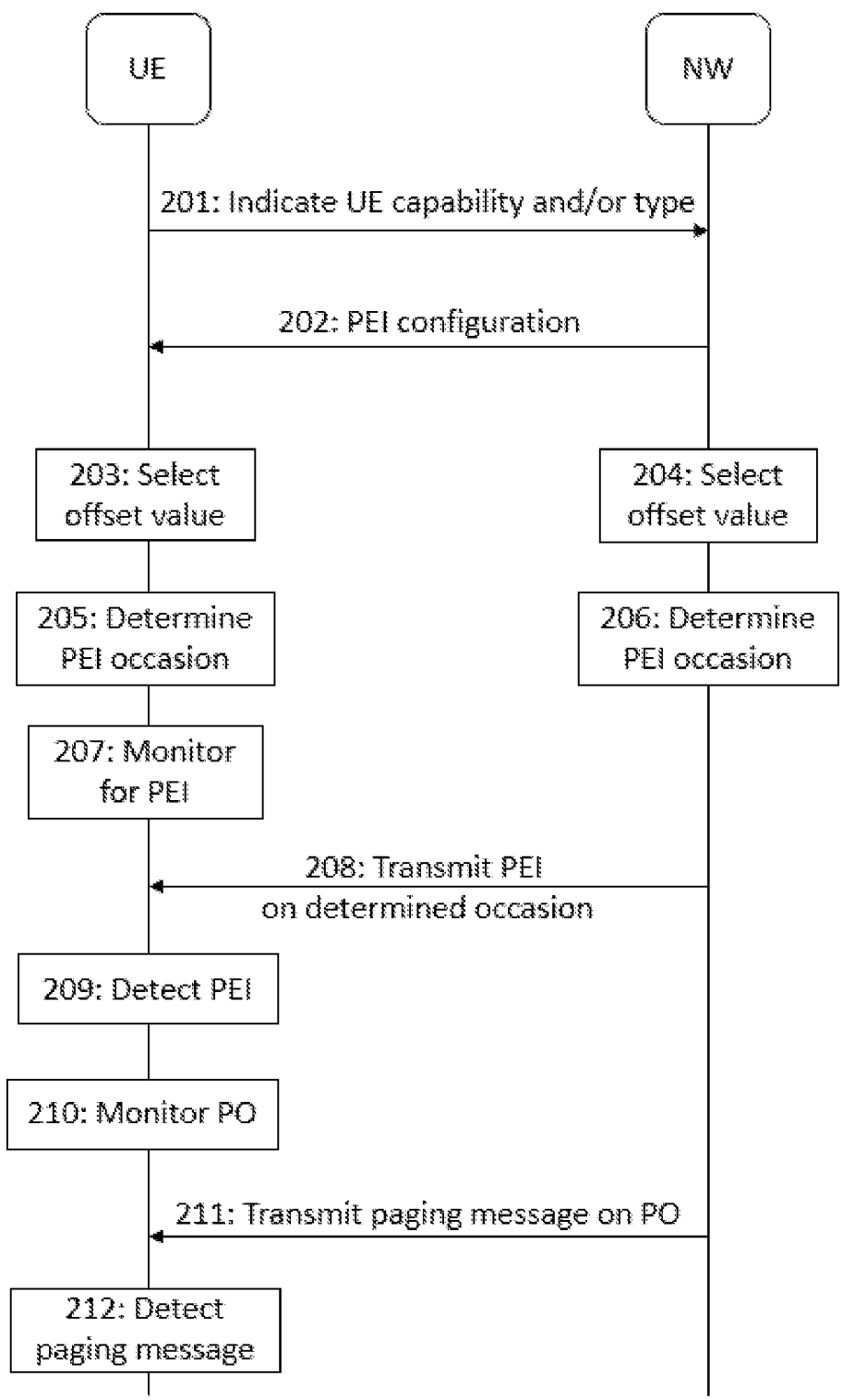
FIGS. 2-3 illustrate signaling diagrams according to some exemplary embodiments.

FIG. 2 illustrates a signaling diagram according to an exemplary embodiment.

Referring to FIG. 2, at least one UE indicates 201 a capability or limitation and/or a type of the of the at least one UE to a network element of a wireless communication network (NW). The network element may be, for example, a base station such as a gNB. Alternatively, the UE may indicate the capability and/or type to a network element in the core network, and the core network may then indicate the capability and/or type to the gNB. By indicating the type of the at least one UE, the at least one UE may indicate whether it is a RedCap device or a non-RedCap device, for example.

The capability or limitation may refer to a capability or limitation of the at least one UE for applying at least one criterion from a plurality of criteria for offset value selection associated with PEI (i.e., the UE may not be able to apply all of the criteria that the network element is capable of applying). The criteria may comprise, for example, at least one of: device type, configured paging cycle, and/or RRC state. For example, some UEs may have full capability of performing the selection based on any or all of the criteria, whereas some other UEs may have limited capability to do the selection based on only one or two of the criteria (e.g., based on the paging cycle or the device type).

The network element transmits 202 a message indicative of a PEI configuration to the at least one UE. The PEI configuration may indicate, for example, for one or more threshold values for paging cycle, a set of at least two pre-defined offset values, and/or one or more criteria for the offset value selection. The message indicative of the PEI configuration may be transmitted to the at least one UE via system information broadcast signaling and/or dedicated signaling (i.e., UE-specific signaling) by the network element. Alternatively, at least a part of the PEI configuration may be pre-configured (e.g., hard-coded) at the UE, in which case there may be no need for the network element to signal the PEI configuration to the UE.

The set of at least two pre-defined offset values may indicate a time offset between a PEI and a paging occasion. Alternatively, the set of at least two pre-defined offset values may indicate an offset between the PEI and a paging frame of the PO. Alternatively, the set of at least two pre-defined offset values may indicate an offset between the paging frame of the PEI and the paging frame of the paging occasion. Similarly, the offset values may be relative to the radio frames of the PEI and the paging occasion, respectively. Each offset value of the set of at least two pre-defined offset values may be defined, for example, as a number of SSBs. Alternatively, each offset value of the set of at least two pre-defined offset values may be defined, for example, as a time-domain value (e.g., in seconds, slots, or subframes). By indicating the set of at least two pre-defined offset values as a number of SSBs instead of as a time-domain value, the signaling of the PEI configuration 202 from the network may be lighter (e.g., if the SSB period is 20 ms, then signaling the number 3 potentially requires less bits than signaling 60 ms). The one or more criteria indicated in the PEI configuration may comprise, or correspond to, the at least one criterion, which the at least one UE indicated that it is capable of applying.

The at least one UE selects 203, based on the one or more criteria and/or the capability or limitation of the UE, at least one offset value from the set of at least two pre-defined offset values. A given UE may select one offset value from the set. Alternatively, a given UE may select more than one offset value from the set.

The network element selects 204, based on the one or more criteria, at least one offset value from the set of at least two pre-defined offset values. The at least one offset value selected by the network element may comprise the at least one offset value selected by the at least one UE. For example, the network element may select one offset value per UE. The selected at least one offset value may be a subset of the set of at least two pre-defined offset values. In other words, the network element may not select all of the at least two pre-defined offset values. Alternatively, the network element may select all of the at least two pre-defined offset values, if at least one UE in each of the PEI occasions needs to be paged (and/or if an ETWS notification, system information update, and/or availability of TRS needs to be indicated to at least one UE in each of the PEI occasions).

The at least one UE determines 205, based on the at least one offset value selected by the at least one UE, at least one time occasion (i.e., PEI occasion) for monitoring for the PEI. If a given UE selected one offset value, then that UE may determine one time occasion. Alternatively, if a given UE selected more than one offset value from the set, then that UE may determine more than one time occasion, i.e., one time occasion per offset value.

The network element determines 206, based on the at least one offset value selected by the network element, at least one time occasion (i.e., PEI occasion) for transmitting the PEI. The at least one time occasion determined by the network element may comprise the at least one time occasion determined by the at least one UE. For example, the network element may determine one time occasion per UE. In other words, the network element may determine one time occasion per selected offset value.

The at least one UE monitors 207 for the PEI on the at least one time occasion determined by the at least one UE. In case there was no suitable offset value found, the UE may skip monitoring for the PEI and monitor 210 the paging occasion instead. If a given UE selected one offset value and determined one time occasion, then that UE may monitor for the PEI on the determined one time occasion. Alternatively, if a given UE selected more than one offset value and determined more than one time occasion (one time occasion per selected offset value), then that UE may monitor for the PEI on the determined more than one time occasion.

The network element transmits 208 the PEI to the at least one UE on the at least one time occasion determined by the network element. The PEI may be transmitted on one time occasion per UE (i.e., there may be a dedicated PEI occasion for each UE).

While monitoring for the PEI, the at least one UE detects 209, i.e., receives, the PEI on the at least one time occasion determined by the at least one UE.

In response to detecting the PEI, the at least one UE monitors 210 for the paging message on at least one paging occasion.

The network element transmits 211, on the at least one paging occasion, paging downlink control information (DCI) as well as a paging message to the at least one UE. For example, the network element may transmit one paging message per UE on one paging occasion per UE.

While monitoring the at least one paging occasion, the at least one UE detects 212, i.e., receives, the paging DCI and the paging message on the at least one paging occasion.

The steps and/or blocks described above by means of FIG. 2 are in no absolute chronological order, and some of them may be performed simultaneously or in an order differing from the described one. Other steps and/or blocks may also be executed between them or within them.

In another exemplary embodiment, step 201 of FIG. 2 may be omitted, if the network element (gNB) obtains the UE capability and/or type information from the core network, which has previously obtained it.

Figure 3:
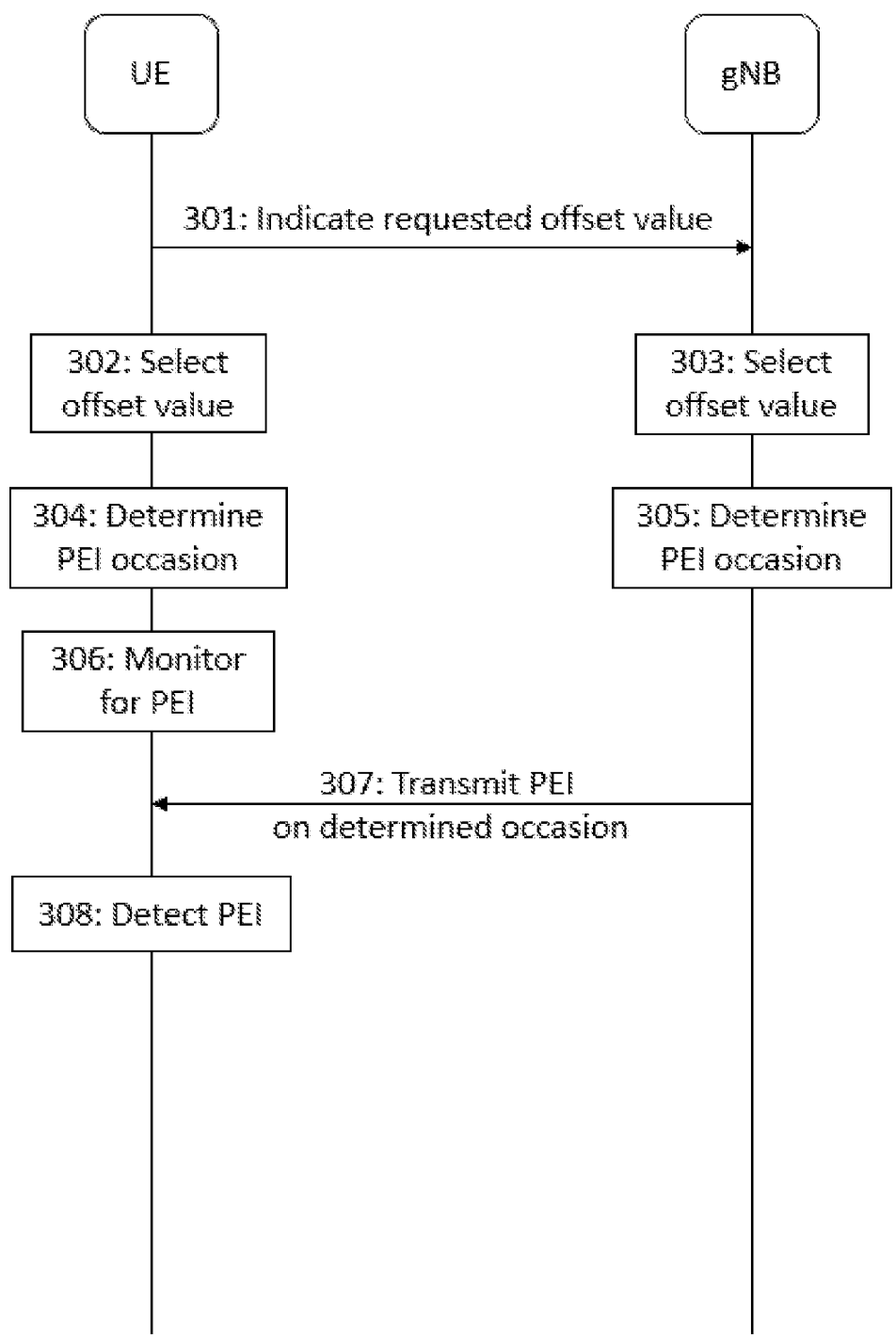

FIG. 3 illustrates a signaling diagram according to an exemplary embodiment, wherein a UE requests a specific offset value to be used.

Referring to FIG. 3, at least one UE transmits 301, to a network element of a wireless communication network, an indication indicating at least one requested offset value. The at least one requested offset value may be an offset value supported by the at least one UE.

The at least one UE selects 302 at least one offset value from a set of at least two pre-defined offset values, wherein the selected at least one offset value comprises the at least one requested offset value. In other words, the requested at least one offset value may be considered as a criterion by the at least one UE for selecting the at least one offset value from the set of at least two pre-defined offset values.

The network element selects 303 at least one offset value from the set of at least two pre-defined offset values, wherein the selected at least one offset value comprises the at least one requested offset value. In other words, the requested at least one offset value may be considered as a criterion by the network element for selecting the at least one offset value from the set of at least two pre-defined offset values. Thus, the at least one offset value selected by the network element may comprise the at least one offset value selected by the at least one UE.

The at least one UE determines 304, based on the at least one offset value selected by the at least one UE, at least one time occasion (i.e., PEI occasion) for monitoring for the PEI.

The network element determines 305, based on the at least one offset value selected by the network element, at least one time occasion (i.e., a PEI occasion) for transmitting the PEI. The at least one time occasion determined by the network element may comprise the at least one time occasion determined by the at least one UE.

The at least one UE monitors 306 for the PEI on the at least one time occasion determined by the at least one UE.

The network element transmits 307 the PEI to the at least one UE on the at least one time occasion determined by the network element. If the network element transmits the PEI to multiple UEs, then the PEI may be transmitted on one time occasion per UE (i.e., there may be one PEI occasion for each UE).

While monitoring for the PEI, the at least one UE detects 308, i.e., receives, the PEI on the at least one time occasion determined by the at least one UE.

Figure 4:
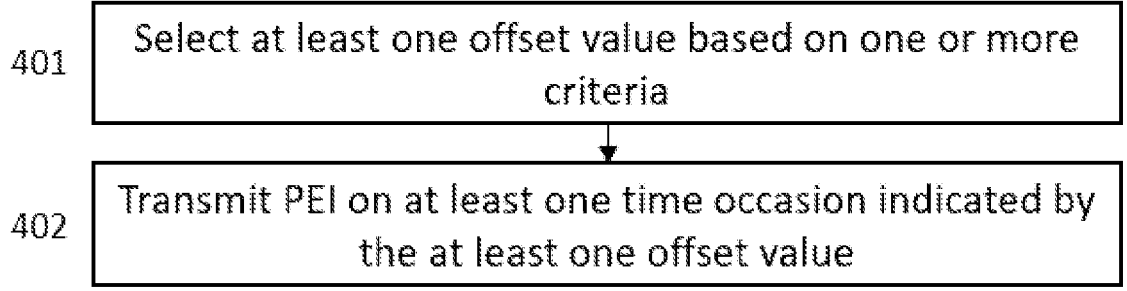
FIGS. 4-9 illustrate flow charts according to some exemplary embodiments.

FIG. 4 illustrates a flow chart according to an exemplary embodiment. The steps illustrated in FIG. 4 may be performed by an apparatus such as, or comprised in, a network element of a wireless communication network.

Referring to FIG. 4, at least one offset value is selected 401, based on one or more criteria, from a set of at least two pre-defined offset values, wherein the selected at least one offset value indicates a time offset between a paging early indication (PEI) and a paging occasion. The PEI is transmitted 402 to at least one terminal device (UE) on at least one time occasion indicated by the selected at least one offset value.

Figure 5:
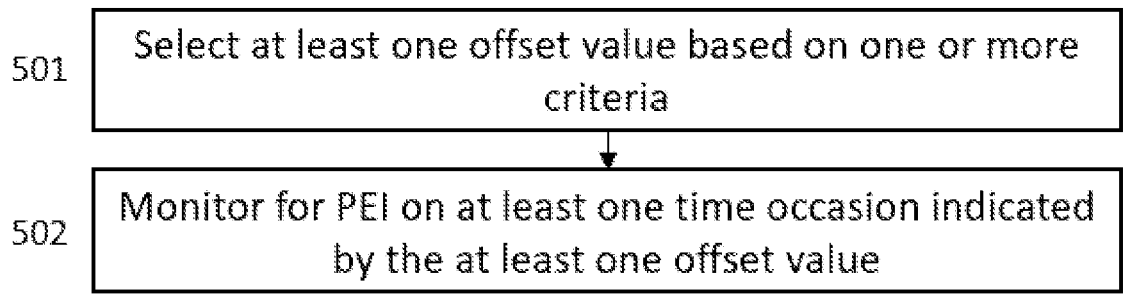

FIG. 5 illustrates a flow chart according to another exemplary embodiment. The steps illustrated in FIG. 5 may be performed by an apparatus such as, or comprised in, a terminal device (UE).

Referring to FIG. 5, at least one offset value is selected 501, based on one or more criteria, from a set of at least two pre-defined offset values, wherein the selected at least one offset value indicates a time offset between a paging early indication (PEI) and a paging occasion. The apparatus monitors 502 for the PEI on at least one time occasion indicated by the selected at least one offset value.

Table 1 below comprises an example of a set of pre-defined offset values (N1, N2, M1, M2) for different device types (UE types) and paging cycles according to an exemplary embodiment. In other words, Table 1 presents a combined configuration depending on the device type and paging cycle. The UE may read system information providing the needed information, such as the thresholds as well as the criteria (i.e., the device type and paging cycle) to be applied for the offset value selection. Based on the configured paging cycle and the device type of the UE, the UE may select an offset value from the set of pre-defined offset values, wherein the selected offset value indicates the time offset between the PEI and the paging offset. For example, if the UE is a RedCap device and the paging cycle of the UE is above the threshold T2, then the UE may select the offset value M2 from the set. Likewise, the network may select the same offset value as the UE based on the configured paging cycle and the device type of the UE, and transmit the PEI on a time occasion indicated by the selected offset value. The UE may then monitor for the PEI on the time occasion indicated by the selected offset value, and receive (detect) the PEI on that time occasion.

TABLE 1

| Device type | Threshold | Paging cycle ≤ threshold | Paging cycle > threshold |
|---|---|---|---|
| Non-RedCap | T1 | N1 | N2 |
| RedCap | T2 | M1 | M2 |

Figure 6:
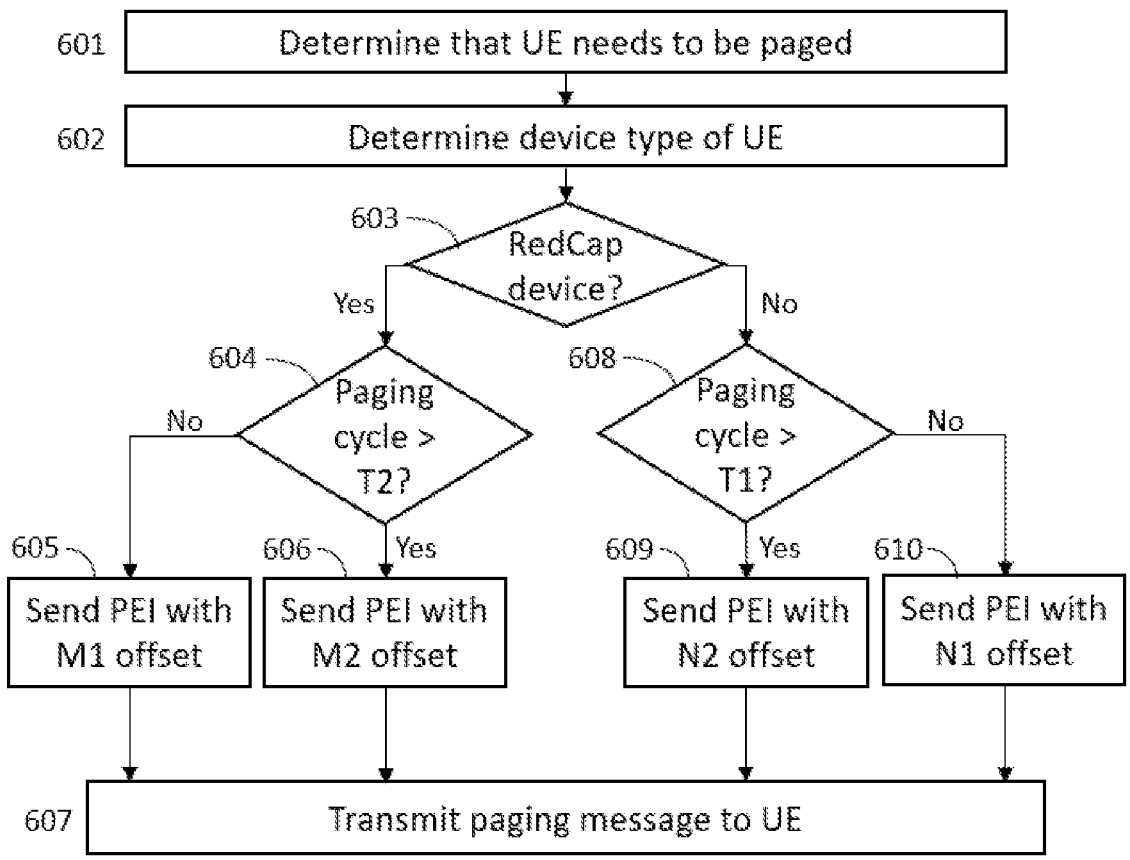

FIG. 6 illustrates a flow chart according to an exemplary embodiment based on Table 1 above. The steps illustrated in FIG. 6 may be performed by an apparatus such as, or comprised in, a network element of a wireless communication network.

Referring to FIG. 6, the apparatus determines 601 that a UE needs to be paged. The apparatus determines 602 the device type of the UE (e.g., whether the UE is a RedCap device or a non-RedCap device).

If the UE is a RedCap device (603: yes), and if the configured paging cycle of the UE is less than or equal to a second threshold value T2 (604: no), then a PEI is transmitted 605 to the UE on a time occasion indicated by the pre-defined offset value M1 (from Table 1). A paging message is transmitted 607 to the UE on a paging occasion.

If the UE is a RedCap device (603: yes), and if the configured paging cycle of the UE is greater than the second threshold value T2 (604: yes), then a PEI is transmitted 606 to the UE on a time occasion indicated by the pre-defined offset value M2 (from Table 1). A paging message is transmitted 607 to the UE on the paging occasion.

If the UE is a non-RedCap device (603: no), and if the configured paging cycle of the UE is greater than a first threshold value T1 (608: yes), then a PEI is transmitted 609 to the UE on a time occasion indicated by the pre-defined offset value N2 (from Table 1). A paging message is transmitted 607 to the UE on the paging occasion.

If the UE is a non-RedCap device (603: no), and if the configured paging cycle of the UE is less than or equal to the first threshold value T1 (608: no), then a PEI is transmitted 610 to the UE on a time occasion indicated by the pre-defined offset value N1 (from Table 1). A paging message is transmitted 607 to the UE on the paging occasion.

Figure 7:
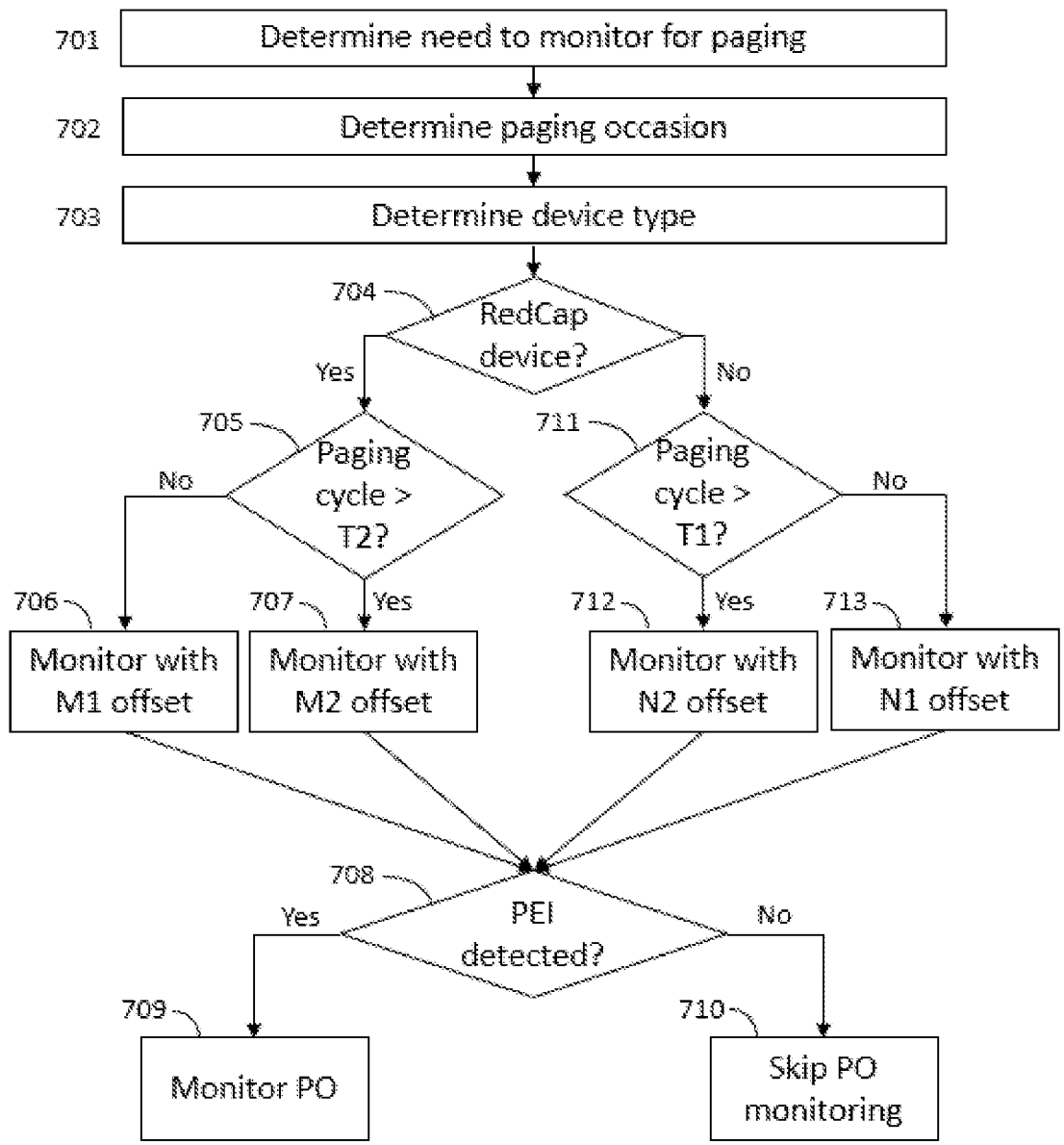

FIG. 7 illustrates a flow chart according to another exemplary embodiment based on Table 1 above. The steps illustrated in FIG. 7 may be performed by an apparatus such as, or comprised in, a terminal device (UE).

Referring to FIG. 7, the apparatus determines 701 that it needs to monitor for a paging message. The apparatus determines 702 a paging occasion for monitoring for the paging message. The apparatus determines 703 the device type of the apparatus (e.g., whether the apparatus is a RedCap device or a non-RedCap device).

If the apparatus is a RedCap device (704: yes), and if the configured paging cycle of the apparatus is less than or equal to a second threshold value T2 (705: no), then the apparatus monitors 706 for a PEI on a time occasion indicated by the pre-defined offset value M1 (from Table 1).

If the apparatus is a RedCap device (704: yes), and if the configured paging cycle of the apparatus is greater than the second threshold value T2 (705: yes), then the apparatus monitors 707 for the PEI on a time occasion indicated by the pre-defined offset value M2 (from Table 1).

If the apparatus is a non-RedCap device (704: no), and if the configured paging cycle of the apparatus is greater than a first threshold value T1 (711: yes), then the apparatus monitors 712 for the PEI on a time occasion indicated by the pre-defined offset value N2 (from Table 1).

If the apparatus is a non-RedCap device (704: no), and if the configured paging cycle of the apparatus is less than or equal to the first threshold value T1 (711: no), then the apparatus monitors 713 for the PEI on a time occasion indicated by the pre-defined offset value N1 (from Table 1).

If the PEI is detected (708: yes) on the monitored time occasion (after any of steps 706, 707, 712, 713), then the apparatus monitors 709 for the paging message on the paging occasion.

If the PEI is not detected (708: no) on the monitored time occasion (after any of steps 706, 707, 712, 713), then the apparatus skips 710 monitoring the paging occasion (i.e., it does not monitor for the paging message during the paging occasion).

Table 2 below comprises another example of a set of pre-defined offset values (K1, K2, L1, L2) for different RRC states and paging cycles according to an exemplary embodiment.

TABLE 2

| RRC state | Threshold | Paging cycle ≤ threshold | Paging cycle > threshold |
|---|---|---|---|
| RRC inactive | T1 | K1 | K2 |
| RRC idle | T2 | L1 | L2 |

Figure 8:
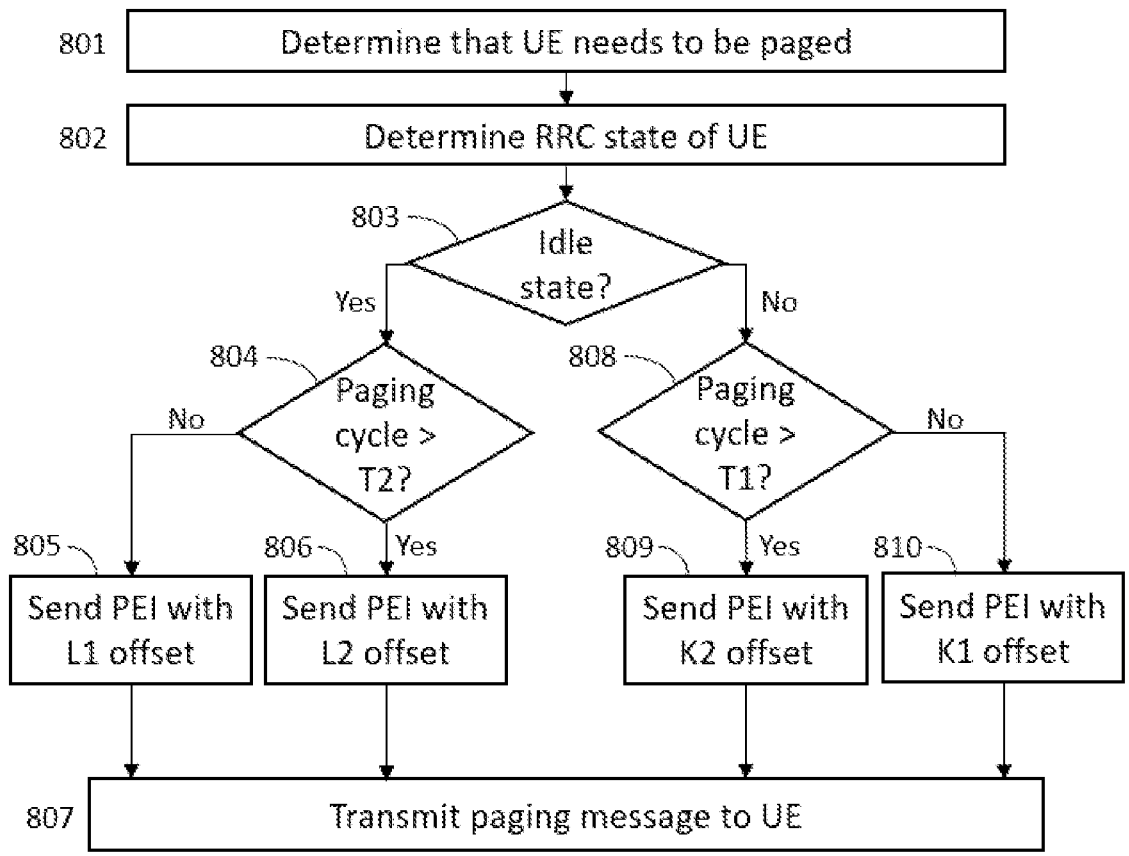

FIG. 8 illustrates a flow chart according to an exemplary embodiment based on Table 2 above. The steps illustrated in FIG. 8 may be performed by an apparatus such as, or comprised in, a network element of a wireless communication network.

Referring to FIG. 8, the apparatus determines 801 that a UE needs to be paged. The apparatus determines 802 the RRC state of the UE (e.g., whether the UE is in RRC idle state or in RRC inactive state).

If the UE is in RRC idle state (803: yes), and if the configured paging cycle of the UE is less than or equal to a second threshold value T2 (804: no), then a PEI is transmitted 805 to the UE on a time occasion indicated by the pre-defined offset value L1 (from Table 2). A paging message is transmitted 807 to the UE on a paging occasion.

If the UE is in RRC idle state (803: yes), and if the configured paging cycle of the UE is greater than the second threshold value T2 (804: yes), then a PEI is transmitted 806 to the UE on a time occasion indicated by the pre-defined offset value L2 (from Table 2). A paging message is transmitted 807 to the UE on the paging occasion.

If the UE is not in RRC idle state (803: no), e.g., if the UE is in RRC inactive state, and if the configured paging cycle of the UE is greater than a first threshold value T1 (808: yes), then a PEI is transmitted 809 to the UE on a time occasion indicated by the pre-defined offset value K2 (from Table 2). A paging message is transmitted 807 to the UE on the paging occasion.

If the UE is not in RRC idle state (803: no), e.g., if the UE is in RRC inactive state, and if the configured paging cycle of the UE is less than or equal to the first threshold value T1 (808: no), then a PEI is transmitted 810 to the UE on a time occasion indicated by the pre-defined offset value K1 (from Table 2). A paging message is transmitted 807 to the UE on the paging occasion.

Figure 9:
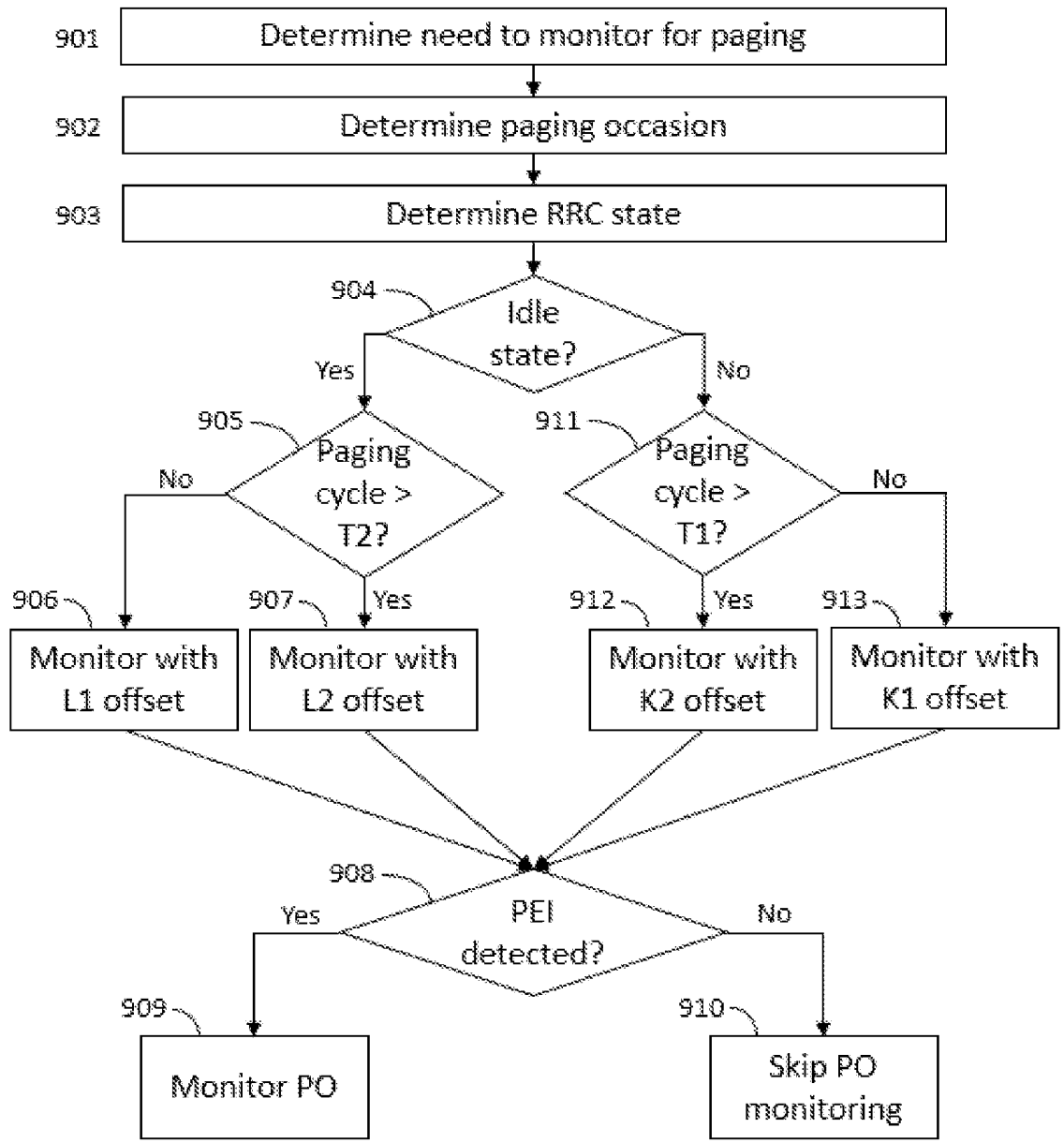

FIG. 9 illustrates a flow chart according to another exemplary embodiment based on Table 2 above. The steps illustrated in FIG. 9 may be performed by an apparatus such as, or comprised in, a terminal device (UE).

Referring to FIG. 9, the apparatus determines 901 that it needs to monitor for a paging message. The apparatus determines 902 a paging occasion for monitoring for the paging message. The apparatus determines 903 the RRC state of the apparatus (e.g., whether the apparatus is in RRC idle state or RRC inactive state).

If the apparatus is in RRC idle state (904: yes), and if the configured paging cycle of the apparatus is less than or equal to a second threshold value T2 (905: no), then the apparatus monitors 906 for a PEI on a time occasion indicated by the pre-defined offset value L1 (from Table 2).

If the apparatus is in RRC idle state (904: yes), and if the configured paging cycle of the apparatus is greater than the second threshold value T2 (905: yes), then the apparatus monitors 907 for the PEI on a time occasion indicated by the pre-defined offset value L2 (from Table 2).

If the apparatus is not in RRC idle state (904: no), e.g., if the apparatus is in RRC inactive state, and if the configured paging cycle of the apparatus is greater than a first threshold value T1 (911: yes), then the apparatus monitors 912 for the PEI on a time occasion indicated by the pre-defined offset value K2 (from Table 2).

If the apparatus is not in RRC idle state (904: no), e.g., if the apparatus is in RRC inactive state, and if the configured paging cycle of the apparatus is less than or equal to the first threshold value T1 (911: no), then the apparatus monitors 913 for the PEI on a time occasion indicated by the pre-defined offset value K1 (from Table 2).

If the PEI is detected (908: yes) on the monitored time occasion (after any of steps 906, 907, 912, 913), then the apparatus monitors 909 for the paging message on the paging occasion.

If the PEI is not detected (908: no) on the monitored time occasion (after any of steps 906, 907, 912, 913), then the apparatus skips 910 monitoring the paging occasion (i.e., it does not monitor for the paging message during the paging occasion).

The steps and/or blocks described above by means of FIGS. 3-9 are in no absolute chronological order, and some of them may be performed simultaneously or in an order differing from the described one. Other steps and/or blocks may also be executed between them or within them.

In another exemplary embodiment, the offset value may be selected based on a combination of the UE type, the RRC state of the UE, and the configured paging cycle of the UE.

In another exemplary embodiment, the one or more criteria may not be defined in the specifications or indicated by the network. In this case, the UE may select the at least one offset value and monitor for the PEI, if the UE determines that it would be beneficial for the UE compared to the case where the UE would only monitor the paging occasion without monitoring for the PEI. In other words, the one or more criteria may comprise one or more UE-specific requirements depending on the UE implementation. Thus, depending on the UE implementation, the UE may or may not select the at least one offset value. If the UE does not select any offset value (or skips the selection), then the UE may skip monitoring for the PEI, and thus the UE may monitor only the paging occasion.

The one or more UE-specific requirements may comprise at least one of: a number of SSB bursts required by the UE between the PEI occasion and the paging occasion, a TRS requirement of the UE, and/or a minimum time offset value for the time offset between the PEI occasion and the paging occasion.

For example, some UEs may require zero SSB bursts between the PEI occasion and the paging occasion, while some other UEs may require one or more SSB bursts between the PEI occasion and the paging occasion. Some UEs may not be able to utilize the PEI, if there is no SSB burst between the PEI occasion and the paging occasion.

As another example, some UEs may require a TRS between the PEI occasion and the paging occasion. Some UEs may not be able to utilize the PEI, if there is no TRS between the PEI occasion and the paging occasion. In other words, the TRS requirement of the UE indicates whether or not the UE requires a TRS between the PEI occasion and the paging occasion.

As another example, some UEs may require a longer time offset between the PEI occasion and the paging occasion. If the time offset is not long enough (i.e., it is below the minimum time offset value required by the UE), then the UE may not be able to utilize the PEI, and thus the UE may decide to monitor only the paging occasion, and to skip monitoring for the PEI.

Furthermore, it may not be feasible for the network to transmit a PEI that is optimal for all UEs. In this case, some UEs may not be able to utilize the PEI.

The UE may select the at least one offset value such that it is possible for the UE to receive the subsequent paging message. The UE needs to be synchronized for the paging reception, i.e., there needs to be a long enough time offset between the PEI and the paging occasion (or TRS or SSB burst). If there is no suitable PEI occasion provided, the UE may decide to monitor only the paging occasion, and to skip monitoring for the PEI (the UE wakes up early enough for paging reception).

A technical advantage provided by some exemplary embodiments is that they may enable the network to optimize the power consumption for example for different types of UEs (i.e., different device categories) and/or UEs with different paging cycles. Furthermore, some exemplary embodiments may reduce signaling overhead.

Figure 10:
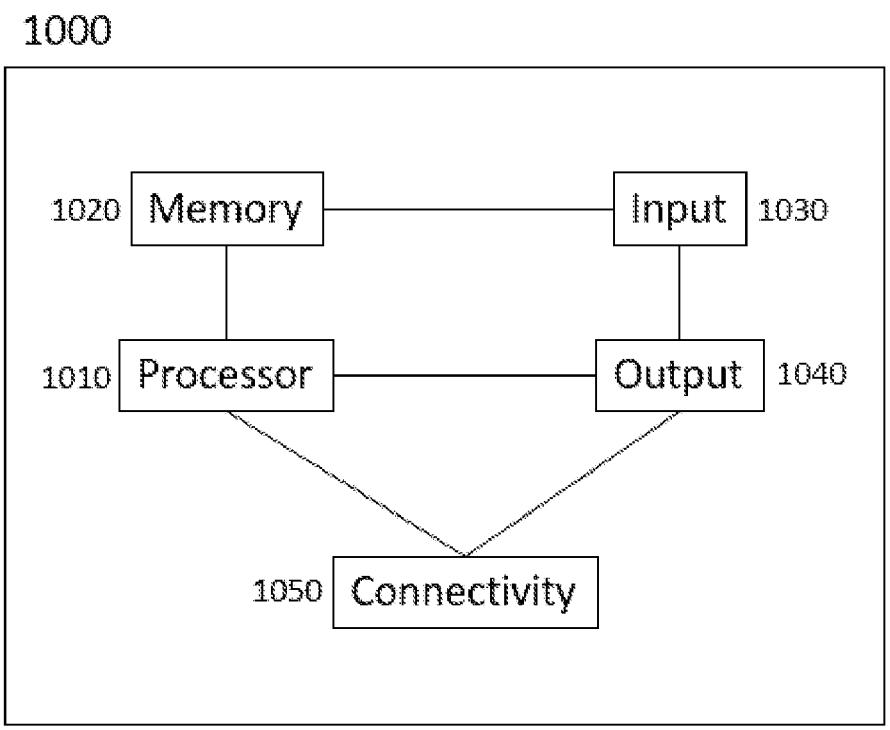
FIGS. 10-11 illustrate apparatuses according to some exemplary embodiments.

FIG. 10 illustrates an apparatus 1000, which may be an apparatus such as, or comprised in, a terminal device, according to an exemplary embodiment. The terminal device may also be referred to as a UE or user equipment herein. The apparatus 1000 comprises a processor 1010. The processor 1010 interprets computer program instructions and processes data. The processor 1010 may comprise one or more programmable processors. The processor 1010 may comprise programmable hardware with embedded firmware and may, alternatively or additionally, comprise one or more application-specific integrated circuits (ASICs).

The processor 1010 is coupled to a memory 1020. The processor is configured to read and write data to and from the memory 1020. The memory 1020 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The memory 1020 stores computer readable instructions that are executed by the processor 1010. For example, non-volatile memory stores the computer readable instructions and the processor 1010 executes the instructions using volatile memory for temporary storage of data and/or instructions.

The computer readable instructions may have been pre-stored to the memory 1020 or, alternatively or additionally, they may be received, by the apparatus, via an electromagnetic carrier signal and/or may be copied from a physical entity such as a computer program product. Execution of the computer readable instructions causes the apparatus 1000 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 1000 may further comprise, or be connected to, an input unit 1030. The input unit 1030 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 1030 may comprise an interface to which external devices may connect to.

The apparatus 1000 may also comprise an output unit 1040. The output unit may comprise or be connected to one or more displays capable of rendering visual content, such as a light emitting diode (LED) display, a liquid crystal display (LCD) and/or a liquid crystal on silicon (LCoS) display. The output unit 1040 may further comprise one or more audio outputs. The one or more audio outputs may be for example loudspeakers.

The apparatus 1000 further comprises a connectivity unit 1050. The connectivity unit 1050 enables wireless connectivity to one or more external devices. The connectivity unit 1050 comprises at least one transmitter and at least one receiver that may be integrated to the apparatus 1000 or that the apparatus 1000 may be connected to. The at least one transmitter comprises at least one transmission antenna, and the at least one receiver comprises at least one receiving antenna. The connectivity unit 1050 may comprise an integrated circuit or a set of integrated circuits that provide the wireless communication capability for the apparatus 1000. Alternatively, the wireless connectivity may be a hardwired application-specific integrated circuit (ASIC). The connectivity unit 1050 may comprise one or more components such as a power amplifier, digital front end (DFE), analog-to-digital converter (ADC), digital-to-analog converter (DAC), frequency converter, (de)modulator, and/or encoder/decoder circuitries, controlled by the corresponding controlling units.

It is to be noted that the apparatus 1000 may further comprise various components not illustrated in FIG. 10. The various components may be hardware components and/or software components.

Figure 11:
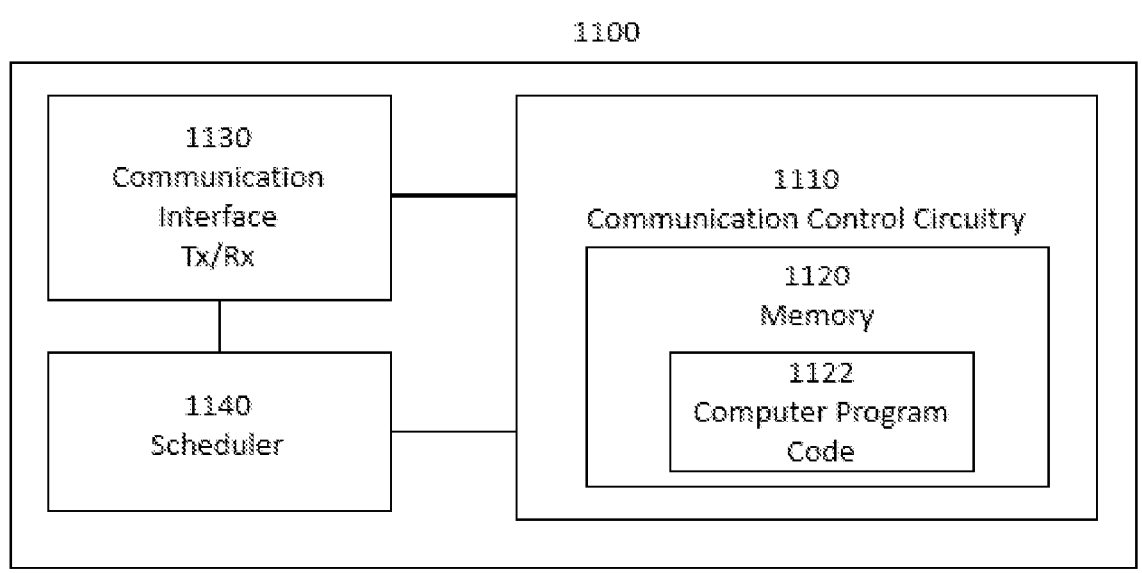

The apparatus 1100 of FIG. 11 illustrates an exemplary embodiment of an apparatus such as, or comprised in, a network element of a wireless communication network. The network element may also be referred to, for example, as a network node, a RAN node, a NodeB, an LTE evolved NodeB (eNB), a gNB, a base station, an NR base station, a 5G base station, an access node, an access point (AP), a distributed unit (DU), a central unit (CU), a baseband unit (BBU), a radio unit (RU), a radio head, a remote radio head (RRH), or a transmission and reception point (TRP). The apparatus 1100 may comprise, for example, a circuitry or a chipset applicable for realizing some of the described exemplary embodiments. The apparatus 1100 may be an electronic device comprising one or more electronic circuitries. The apparatus 1100 may comprise a communication control circuitry 1110 such as at least one processor, and at least one memory 1120 including a computer program code (software) 1122 wherein the at least one memory and the computer program code (software) 1122 are configured, with the at least one processor, to cause the apparatus 1100 to carry out some of the exemplary embodiments described above.

The processor is coupled to the memory 1120. The processor is configured to read and write data to and from the memory 1120. The memory 1120 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The memory 1120 stores computer readable instructions that are executed by the processor. For example, non-volatile memory stores the computer readable instructions and the processor executes the instructions using volatile memory for temporary storage of data and/or instructions.

The computer readable instructions may have been pre-stored to the memory 1120 or, alternatively or additionally, they may be received, by the apparatus, via an electromagnetic carrier signal and/or may be copied from a physical entity such as a computer program product. Execution of the computer readable instructions causes the apparatus 1100 to perform one or more of the functionalities described above.

The memory 1120 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some exemplary embodiments, structures of the frames used in the detected neighbour cells.

The apparatus 1100 may further comprise a communication interface 1130 comprising hardware and/or software for realizing communication connectivity according to one or more communication protocols. The communication interface 1130 comprises at least one transmitter (Tx) and at least one receiver (Rx) that may be integrated to the apparatus 1100 or that the apparatus 1100 may be connected to. The communication interface 1130 provides the apparatus with radio communication capabilities to communicate in the cellular communication system. The communication interface may, for example, provide a radio interface to terminal devices. The apparatus 1100 may further comprise another interface towards a core network such as the network coordinator apparatus and/or to the access nodes of the cellular communication system. The apparatus 1100 may further comprise a scheduler 1140 that is configured to allocate resources.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s)), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus comprising at least one processor, and at least one memory including computer program code, wherein the at least one memory and the computer program code are configured, with the at least one processor, to cause the apparatus to:

select, based on one or more criteria, at least one offset value from a set of at least two pre-defined offset values, said one or more criteria comprising at least a configured paging cycle of at least one terminal device, wherein the selected at least one offset value indicates a time offset between a paging early indication and a paging occasion; and transmit, to the at least one terminal device, the paging early indication on at least one time occasion indicated by the selected at least one offset value.

2. The apparatus according to claim 1, wherein the at least one offset value is selected based at least partly on a type of the at least one terminal device, said type being one of the one or more criteria.

3. The apparatus according to claim 2, wherein a larger offset value of the at least two pre-defined offset values is selected as the at least one offset value, if the type of the at least one terminal device is a reduced capability device.

4. The apparatus according to claim 1, wherein the at least one offset value is selected based at least partly by comparing the configured paging cycle of the at least one terminal device to one or more threshold values; and wherein the apparatus is further caused to indicate the one or more threshold values to the at least one terminal device.

5. The apparatus according to claim 1, wherein the at least one offset value is selected based at least partly on a radio resource control state of the at least one terminal device, said radio resource control state being one of the one or more criteria.

6. The apparatus according to claim 1, wherein the apparatus is further caused to indicate the one or more criteria to the at least one terminal device.

7. The apparatus according to claim 1, wherein the apparatus is further caused to indicate, to the at least one terminal device, the set of at least two pre-defined offset values associated with the one or more criteria.

8. The apparatus according to claim 1, wherein each offset value of the set of at least two pre-defined offset values is defined as a number of synchronization signal blocks.

9. The apparatus according to claim 1, wherein the apparatus is further caused to:
receive, from the at least one terminal device, an indication indicating a capability of the at least one terminal device for applying at least one criteria of the one or more criteria for offset value selection;
wherein the at least one offset value is selected based on the at least one criteria indicated by the at least one terminal device.

10. An apparatus comprising at least one processor, and at least one memory including computer program code, wherein the at least one memory and the computer program code are configured, with the at least one processor, to cause the apparatus to:
select, based on one or more criteria, at least one offset value from a set of at least two pre-defined offset values, said one or more criteria comprising at least a configured paging cycle of the apparatus, wherein the selected at least one offset value indicates a time offset between a paging early indication and a paging occasion; and
monitor for the paging early indication on at least one time occasion indicated by the selected at least one offset value.

11. The apparatus according to claim 10, wherein the at least one offset value is selected based at least partly on a type of the apparatus, said type being one of the one or more criteria.

12. The apparatus according to claim 10, wherein the apparatus is further caused to receive an indication indicating one or more threshold values for the configured paging cycle;
wherein the at least one offset value is selected based at least partly by comparing the configured paging cycle of the apparatus to the one or more threshold values.

13. The apparatus according to claim 10, wherein the at least one offset value is selected based at least partly on a radio resource control state of the apparatus, said radio resource control state being one of the one or more criteria.

14. The apparatus according to claim 10, wherein the apparatus is further caused to receive an indication indicating the one or more criteria and the set of at least two pre-defined offset values associated with the one or more criteria.

15. The apparatus according to claim 10, wherein each offset value of the set of at least two pre-defined offset values is defined as a number of synchronization signal blocks.

16. The apparatus according to claim 10, wherein the apparatus is further caused to:
transmit an indication indicating a capability of the apparatus for applying the one or more criteria for offset value selection.

17. The apparatus according to claim 10, wherein the apparatus is further caused to:
receive the paging early indication on the at least one time occasion indicated by the selected at least one offset value.

18. The apparatus according to claim 10, wherein the apparatus is further caused to:
transmit an indication indicating a requested offset value;
wherein the selected at least one offset value comprises at least the requested offset value.

19. The apparatus according to claim 10, wherein the one or more criteria comprise at least one of: a number of synchronization signal block bursts required by the apparatus, a tracking reference signal requirement of the apparatus, and/or a minimum time offset value.

20. A method comprising:
selecting, based on one or more criteria, at least one offset value from a set of at least two pre-defined offset values, said one or more criteria comprising at least a configured paging cycle of an apparatus, wherein the selected at least one offset value indicates a time offset between a paging early indication and a paging occasion; and
monitoring for the paging early indication on at least one time occasion indicated by the selected at least one offset value.

* * * * *